Feb. 6, 1923. 1,444,386.
H. T. PYLE.
METHOD OF PEELING FRUIT.
FILED OCT. 14, 1922.
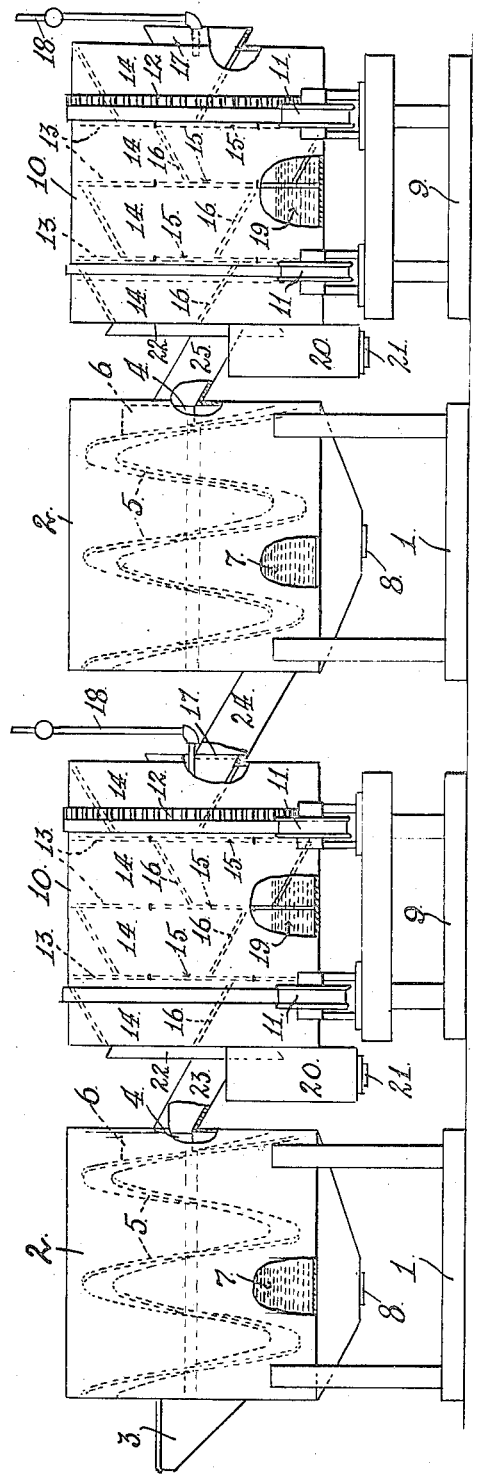
Inventor.
Harry T. Pyle
By Booth & Booth
Attorneys Patented Feb. 6, 1923.

1,444,386

UNITED STATES PATENT OFFICE.

HARRY T. PYLE, OF SAN JOSE, CALIFORNIA.

METHOD OF PEELING FRUIT.

Application filed October 14, 1922. Serial No. 594,460.

*To all whom it may concern:*

Be it known that I, HARRY T. PYLE, a citizen of the United States, residing at San Jose, in the county of Santa Clara and State of California, have invented certain new and useful Improvements in Methods of Peeling Fruit, of which the following is a specification.

My invention relates to methods for removing the peel or skin of fruit, especially as the art is applied to canning practise.

In this art, particularly in connection with the peeling of peaches and apricots, the accepted and generally prevailing method comprises the initial softening or pulpy disintegration of the skin by the subjection of the fruit to a lye bath, and the subsequent removal of the softened pulpy peel by the action of water, applied in various ways with sufficient force to clear the fruit of the skin.

Furthermore, it must be pointed out that although in some cases the fruit is thus treated whole, the practise is almost universal to treat it halved; that is to say, the fruit is cut in half and the pit removed prior to its subjection to the lye bath. This practise, of course, exposes in each half the complemental hollow section of the pit cavity, which is commonly termed the "cup" as applied to the halved fruit. The exposure of the cavity, however, presents a difficulty early recognized, and not yet, as far as I am aware, wholly obviated. It is essential that the peeled product shall be thoroughly cleansed, over its entire surface including the pit cavity, of all skin and adhering or lodging particles thereof, and shall be free of discoloration. While this result is relatively easy of attainment as far as the convex surface of the half sections is concerned, it is not so with regard to the pit cavity, for two reasons, first because of the nature of the cavity surface and the caustic reaction of the lye thereon, and second because of the opportunity the cavity affords for the lodgment therein of particles of the washed off skin. Nor in practise, does the adjustment of the washing pressure or force wholly remedy the difficulty, for the reason I shall presently explain, and the result is that much of the fruit comes out with discolored pit cavities or "cups" in which particles of skin still adhere.

In common practise the halved and pitted fruit is initially subjected to a relatively strong lye bath, for a relatively long time. As an example of these relativities I may give a lye solution of from 8% to 20% hydrometer test, according to the variety of the fruit, the place where grown, its ripeness and other conditions known to those skilled in the art, and a time period of immersion in the lye bath, from one-half minute to one and a half minutes. The fruit is then subjected to the washing or skin removing phase of the process, and these two steps complete the operation.

It will thus be seen that the lye-bath step is intended to at once complete its function of softening or disintegrating all the peel or skin, and to do this it must be relatively strong in lye and the period of immersion of the fruit must be relatively long. But these factors result in overheating, softening the outer tissues, and drawing to the surface of the pit cavities the starch, making a jelly consisting partly of starch and partly of sloughed off skin, which lodging in the cavities is difficult to wash out.

With the foregoing in view my method will now be understood. It comprises essentially and broadly stated an initial step to soften or disintegrate the skin or peel of the fruit to a depth less than the whole, followed by a washing step to remove the part of the skin or peel so softened or disintegrated, followed by a step to soften or disintegrate the remainder of the skin or peel, followed by a washing step to remove said remainder of the skin or peel.

In practise, the first step of my method is carried out by either reducing the strength of the lye bath, or by reducing the time period of immersion of the fruit in the lye bath, or by reducing both strength and time period. As an example, though I am not to be confined thereto, I may give a lye-bath strength of from 6% to 12% hydrometer test, and a time period of 20 to 40 seconds.

The second step is carried out by a washing effect adjusted in function to remove the portion of the skin or peel softened in the first step. The third step is accomplished by a lye bath and time period of immersion sufficient to soften the remainder of the skin or peel, and in practice, the effect in which this step is carried out is not essentially different from the effect in which the first step is carried out.

Finally, the fourth step is accomplished in a washing effect similar to the washing effect of the second step.

It will now be seen that by softening the skin or peel in part only of its thickness, I reduce the amount thereof liable to lodge in the pit cavities, and render its washing out easier of accomplishment and more complete, and also by the reduced reaction of the lye bath due to its relatively low strength and the relatively short period of immersion of the fruit, I avoid the overheating of the fruit and the deleterious action of the lye on the surface of the pit cavity, both of which conduce to the desirable result of leaving the pit cavity clean after the first washing effect. Then the third and fourth steps repeat these advantages to completion.

It may also be noted that neither lye bath is weakened by an excess of sloughed-off skin.

In order to more fully understand my method, I refer to the accompanying drawings which illustrate somewhat diagrammatically, but in sufficient detail, an apparatus in which the method may be carried out.

The figure is an elevation of the apparatus.

1 is a frame carrying a tank 2 having a feed hopper 3 at one end and a discharge opening 4 in its other end. Within the tank is a spiral conveyer 5 with a discharge scoop indicated by 6 at one end which is adapted to lift the fruit advanced to it by the rotation of the conveyer, and discharge it through the opening 4. Within the tank 2 is a body of liquid indicated by 7, and which is the lye bath, the function of which is to soften the skin of the fruit. 8 indicates the drain for the lye bath. This lye bath is as usual heated, the heat being imparted by a suitable medium, say for example steam, the means for introducing which are unnecessary herein to show.

Following the lye-bath tank 2 which constitutes the initial skin-softening effect of my method is a frame 9 carrying a drum 10 mounted for rotation on its axis upon supporting rolls 11 and rotated by power applied to a circumferential gear 12. The drum, as shown by the dotted lines is interiorly divided by perforated partitions 13 into a plurality of compartments 14 successively communicating through openings 15 in the partitions, lying in the axis of the drum. In each compartment is a lifting volute flange 16 by which the fruit is picked up and discharged through the axis openings 15 into successive compartments, and from the last compartment the fruit is discharged through an opening 17. Into the last compartment of the drum a pipe 18 delivers the washing water, and this water lies as a body indicated by 19 in the lower portion of the drum and flows constantly, through the perforated partitions 13 in a direction counter to that in which the fruit is advanced and finally passes from the first compartment into a waste receptacle 20 with a drain 21.

The drum 10 thus constitutes the first washing effect of my method, and its receiving opening 22 is in direct communication with the discharge opening 4 of the lye tank 2 through the intervention of a chute 23.

Following the drum 10 of the first washing effect, and directly communicating therewith by means of a chute 24 is the second lye bath effect, which is similar to the first lye bath effect, its parts being designated by similar numerals.

Finally, following the second lye bath effect and communicating therewith by a chute 25 is the second washing effect similar to the first washing effect and designed by like numerals.

As the drawing herewith presented is intended merely to illustrate, in general, one form of an apparatus which may be used to carry out my method, and as it comprises structures individually now well known and in common use, I have not deemed it necessary to complicate it with details of parts nor of driving mechanism.

In carrying out my method the fruit is fed through the hopper 3 to the tank 2 of the initial effect and is carried through the lye bath 7 therein by the spiral 5. The action of this initial lye bath is by predetermination so regulated as I have hereinbefore stated, as to produce only a softening of the skin to a partial depth, and as the fruit, delivered by the chute 23 to the drum 10 of the first washing effect passes through said drum, only that modicum of the skin previously softened is removed. In the second lye bath effect the remainder of the skin is softened, and in the second washing effect this softened remainder is removed.

I claim:—

1. The method of peeling fruit which comprises initially softening the skin to a partial depth; then removing said softened part of the skin; then softening the remainder of the skin; and finally removing said softened remainder.

2. The method of peeling fruit which comprises the initial softening of the skin to a partial depth by subjection to a lye bath; then washing off said softened part of the skin; then softening the remainder of the skin by subjection to a second lye bath; and finally washing off said softened remainder.

3. The method of peeling fruit previously halved and pitted which comprises the initial softening of the skin to a partial depth by subjection to a lye bath; then washing off said softened part of the skin; then softening the remainder of the skin by subjection to a second lye bath; and finally washing off said softened remainder.

4. The method of peeling fruit which consists in first halving the fruit and removing the pit; then softening the skin of the halved fruit to a partial depth by subjection to a lye bath; then washing off said softened part of the skin; then softening the remainder of the skin by subjection to a second lye bath and finally washing off said softened remainder.

5. The method of peeling fruit which consists in alternately softening the skin to successive depths, and removing the skin softened.

6. The method of peeling fruit which consists in alternately softening the skin to successive depths by subjecting the fruit to successive lye baths, and removing the softened skin by subjecting the fruit to washing action.

7. The method of peeling fruit which consists in first halving the fruit and removing the pit; and then alternately softening the skin of the halved sections to successive depths by subjecting them to successive lye baths, and removing the softened skin by subjecting the sections to washing action.

In testimony whereof I have signed my name to this specification.

HARRY T. PYLE.